US009225394B2

United States Patent
Ihm et al.

(10) Patent No.: US 9,225,394 B2
(45) Date of Patent: Dec. 29, 2015

(54) METHOD AND APPARATUS FOR RECEIVING A SIGNAL FROM A BASE STATION HAVING A PLURALITY OF ANTENNAS

(75) Inventors: Bin Chul Ihm, Anyang-si (KR); Ji Won Kang, Anyang-si (KR); Su Nam Kim, Anyang-si (KR); Jin Young Chun, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 576 days.

(21) Appl. No.: 13/642,482

(22) PCT Filed: Apr. 19, 2011

(86) PCT No.: PCT/KR2011/002773
§ 371 (c)(1),
(2), (4) Date: Oct. 19, 2012

(87) PCT Pub. No.: WO2011/132905
PCT Pub. Date: Oct. 27, 2011

(65) Prior Publication Data
US 2013/0034074 A1  Feb. 7, 2013

Related U.S. Application Data

(60) Provisional application No. 61/325,771, filed on Apr. 19, 2010.

(51) Int. Cl.
*H04W 72/12* (2009.01)
*H04B 7/02* (2006.01)
*H04W 72/04* (2009.01)
*H04W 48/12* (2009.01)

(52) U.S. Cl.
CPC ............ *H04B 7/026* (2013.01); *H04W 72/046* (2013.01); *H04W 48/12* (2013.01)

(58) Field of Classification Search
None
See application file for complete search history.

(56) References Cited

U.S. PATENT DOCUMENTS

| 2008/0248805 | A1 | 10/2008 | Han et al. | |
|---|---|---|---|---|
| 2009/0052354 | A1* | 2/2009 | Wu et al. | 370/280 |
| 2009/0232122 | A1* | 9/2009 | Suda et al. | 370/345 |
| 2009/0253429 | A1 | 10/2009 | Lee et al. | |
| 2009/0257533 | A1 | 10/2009 | Lindoff et al. | |
| 2010/0040006 | A1 | 2/2010 | Caire | |
| 2010/0177683 | A1* | 7/2010 | Lindoff et al. | 370/328 |

* cited by examiner

*Primary Examiner* — Michael Thier
*Assistant Examiner* — Feben M Haile
(74) *Attorney, Agent, or Firm* — Lee, Hong, Degerman, Kang & Waimey

(57) ABSTRACT

In a communication system including a base station having a plurality of antennas, a first terminal supporting a first antenna system and a second terminal supporting a second antenna system, at least one of the first or second terminal acquires information that is contained in a signal received from the base station through a first wireless resource region and a second wireless resource region. The first terminal acquires the information contained in the first and second wireless resource regions through a signal transmitted by an antenna in a first group among the plurality of antennas. The second terminal acquires the information contained in the first wireless resource region through a signal transmitted by an antenna in the first group, and the information contained in the second wireless resource region through a signal transmitted by an antenna in the first group and/or in a second group among the plurality of antennas.

12 Claims, 11 Drawing Sheets

METHOD AND APPARATUS FOR RECEIVING A SIGNAL FROM A BASE STATION HAVING A PLURALITY OF ANTENNAS

CROSS-REFERENCE TO RELATED APPLICATIONS

This application is the National Stage filing under 35 U.S.C. 371 of International Application No. PCT/KR2011/002773, filed on Apr. 19, 2011, which claims the benefit of U.S. Provisional Application Ser. No. 61/325,771, filed on Apr. 19, 2010, the contents of which are all hereby incorporated by reference herein in their entirety.

TECHNICAL FIELD

The present invention relates to a wireless communication system including a plurality of antennas and, more particularly, to a method and apparatus for receiving a signal from a base station having a plurality of antennas.

BACKGROUND ART

A general wireless communication system includes a plurality of transmission antennas based on a cell, and uses various MIMO (multiple-input and multiple-output) techniques. For example, techniques such as OL-MIMO (open-loop MIMO), CL-SU-MIMO (closed-loop single-user IMO), CL-MU-MIMO (closed-loop multiple-user MIMO), Multi-BS-MIMO (multiple base station MIMO), and the like, may be used.

In general, a system in which all the antennas are installed and operated in a base station (BS) is called as a centralized antenna system (CAS). Known characteristics of a CAS are a path loss and shadowing effect with respect to each antenna are substantially the same because distances between antennas are short relative to a cell radius of a BS. Also, in case of a CAS-based communication system, since link quality of a terminal is different according to a distance between the terminal and a BS, there may be a significant difference in throughput performance between an inner cell user and a cell-edge user.

DISCLOSURE

Technical Problem

A specific method and apparatus hereinafter are proposed to improve a general antenna system. A specific method and example hereinafter may effectively transmit data and/or a control channel in a wireless communication system including terminals supporting different antenna systems.

Technical Solution

Hereinafter, a communication method and a communication apparatus having improved performance are proposed.

A specific method in a wireless communication system including a base station including a plurality of transmission antennas, a first terminal supporting a first antenna system, and a second terminal supporting a second antenna system, includes obtaining, by at least one of the first terminal and the second terminal, information included in a signal received from the base station, wherein the signal received from the base station is received through at least first radio resource region and second radio resource region, the first terminal obtains information included in the first radio resource region and the second resource region through a signal transmitted by a transmission antenna of a first group among a plurality of transmission antennas, the second terminal obtains information included in the first radio resource region through a signal transmitted by a transmission antenna of the first group and obtains information included in the second radio resource region through a signal transmitted by a transmission antenna of the first group and/or a second group among the plurality of transmission antennas, and the transmission antenna of the second group is allocated to the second terminal.

In detail, the first antenna system may be a centralized antenna system, and the second antenna system may be a distributed antenna system.

In detail, the first radio resource region and the second radio resource region may include an OFDMA system, respectively.

In detail, a precoding matrix common to terminals may be applied to the first radio resource region or no precoding matrix may be applied to the first radio resource region, and a precoding matrix distinguishable by terminals is applied to the second radio resource region.

In detail, the transmission antennas of the first group may be allocated to every terminal.

In detail, the first radio resource region may be allocated to a distributed resource unit (DRU), the first or second radio resource region may be allocated to a contiguous resource unit (CRU), and the CRU may include a subband-CRU and a miniband-CRU.

In detail, when the second terminal obtains information regarding the second radio resource region allocated to the CRU, the second terminal may obtain information included in the second radio resource region through a signal transmitted by a transmission antenna of the first group and/or a signal transmitted by a transmission antenna of the second group.

In detail, the transmission antennas belonging to the first group and the second group among the plurality of transmission antennas may be determined by the BS.

In detail, the signal received from the BS may be included in at least one subframe, and each subframe may be comprised of two slots, each slot may include a plurality of orthogonal frequency-division multiple access (OFDMA) symbols, a signal received from the BS may include a physical downlink control channel (PDCCH) including control information and a physical downlink shared channel (PDSCH) including user data, the first radio resource region may include the PDCCH, and the second radio resource region may include the PDSCH.

Another example described hereinafter provides a method for transmitting a signal by a base station. The method in a wireless communication system including a base station (BS) including a plurality of transmission antennas, a first terminal supporting a first antenna system, and a second terminal supporting a second antenna system, includes: transmitting, by the BS, a signal to at least one of the first terminal and the second terminal, wherein the signal transmitted by the BS is transmitted through a first radio resource region and a second radio resource region, the first terminal obtains information included in the first radio resource region and the second radio resource region through a signal transmitted by a transmission antenna of a first group among a plurality of transmission antennas, the second terminal obtains information included in the first radio resource region through a signal transmitted by a transmission antenna of the first group and obtain information included in the second radio resource region through a signal transmitted by a transmission antenna of the first group and/or the second group among the plurality of transmission antennas, and the transmission antenna of the second group is allocated to the second terminal.

Advantageous Effects

According to specific examples hereinafter, a wireless communication system having improved performance can be implemented. In detail, a channel for user data and a channel for control information may be effectively transmitted by discriminating transmission antennas.

MODE FOR INVENTION

The following technique may be used for various multiple access schemes such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as a radio technology such as UTRA (Universal Terrestrial Radio Access) or CDMA2000. TDMA may be implemented as a radio technology such as GSM (Global System for Mobile communications)/GPRS (General Packet Radio Service)/EDGE (Enhanced Data Rates for GSM Evolution). OFDMA may be implemented as a radio technology such as IEEE 802.11 (Wi-Fi), IEEE 802.16 (WiMAX), IEEE 802-20, E-UTRA (Evolved UTRA), and the like. UTRA (UMTS Terrestrial Radio Access) is part of UMTS (Universal Mobile Telecommunications System). 3GPP (3rd Generation Partnership Project) LTE (long term evolution) is part of E-UMTS (Evolved UMTS) using E-UTRA, which employs OFDMA in downlink and SC-FDMA in uplink. LTE-A (Advanced) is an advancement of 3GPP LTE.

Hereinafter, in order to clarify description, embodiments of the present invention will be described based on IEEE 802.16m and 3GPP LTE (Long Term Evolution). However, examples hereinafter may also be applied to any other communication standards.

Hereinafter, IEEE 802.16m will be described. IEEE 802.16e standard was adapted in the name of 'WMAN-OFDMA TDD' as the sixth standard for IMT (International Mobile Telecommunication)-2000 at ITU-R (ITU Radiocommunication Sector) under the umbrella of ITU (International Telecommunication Union) in 2007. ITU-R is preparing an IMT-Advanced system as a next-generation 4G mobile communication standard after IMT-2000. IEEE 802.16 WG (Working Group) decided to carry forward an IEEE 802.16m project aiming at establishing an amendment standard of existing IEEE 802.16e. As noted from the aim, the IEEE 802.16m standard involves two aspects: past continuity of an amendment of the IEEE 802.16e standard and future continuity of a standard for a next-generation IMT-Advanced system. Thus, the IEEE 802.16m standard is required to satisfy all the advanced requirements for an IMT-Advanced system, while maintaining compatibility with a mobile WiMAX system based on the IEEE 802.16e standard.

Figure 1:
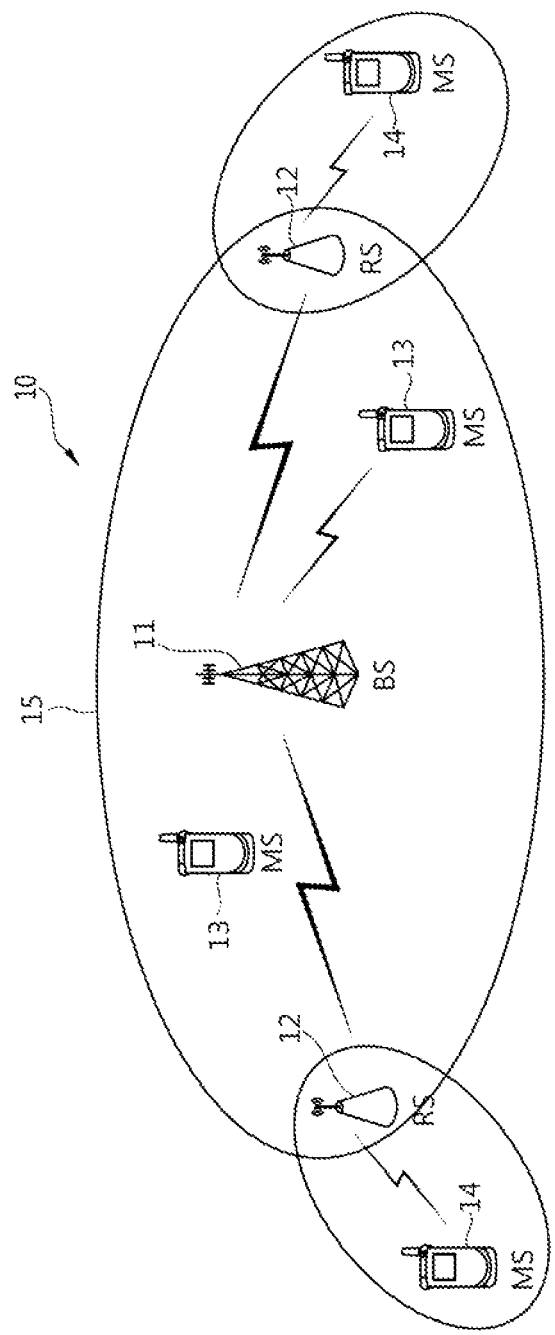
FIG. 1 is view illustrating a wireless communication system including mobile stations (MSs).

FIG. 1 shows a wireless communication system including terminals (i.e., mobile stations (MSs) or user equipments (UEs)).

Referring to FIG. 1, the wireless communication system 10 including MSs includes at least one base station (BS) 11. Each BS 11 provides a communication service to a particular geographical area 15 generally called a cell. A cell may be divided into a plurality of areas, and each area is called a sector. One or more cells may exist within coverage of a single BS, and one or more BSs may exist in a single cell. The BS 11 generally refers to a fixed station that communicates with an MS 13 and may be called by other names such as evolved NodeB (eNB), base transceiver system (BTS), access point (AP), access network (AN), advanced base station (ABS), node (or antenna node), or the like. The BS 11 may include a relay station (RS) 12. In this case, the BS 11 may perform functions such as connectivity, management, control, and resource allocation between the RS 12 and an MS 14.

The RS 12 refers to a device that relays a signal between the BS 11 and the MS 14 and may be called by other names such as relay node (RN), repeater, relay, advanced RS, or the like.

The MSs 13 and 14 may be fixed or mobile, which may be referred to by other names such as advanced mobile station (AMS), user terminal (UT), subscriber station (SS), wireless device, personal digital assistant (PDA), wireless modem, handheld device, access terminal (AT), user equipment (UE), or the like. Hereinafter, a macro MS refers to a terminal that directly communicates with the BS 11, and a relay station terminal refers to a terminal that communicates with an RS. Even the macro MS within the cell of the BS 11 may communicate with the BS 11 through the RS 12 in order to improve a transfer rate according to a diversity effect.

Between a BS and a macro MS, downlink (DL) refers to communication from the BS to the macro MS and uplink refers to communication from the macro MS to the BS. Between a BS and an RS, downlink refers to communication from the BS to the RS and uplink refers to communication from the RS to the BS. Between an RS and an RS MS, downlink refers to communication from the RS to the RS MS and uplink refers to communication from the RS MS to the RS.

Figure 2:
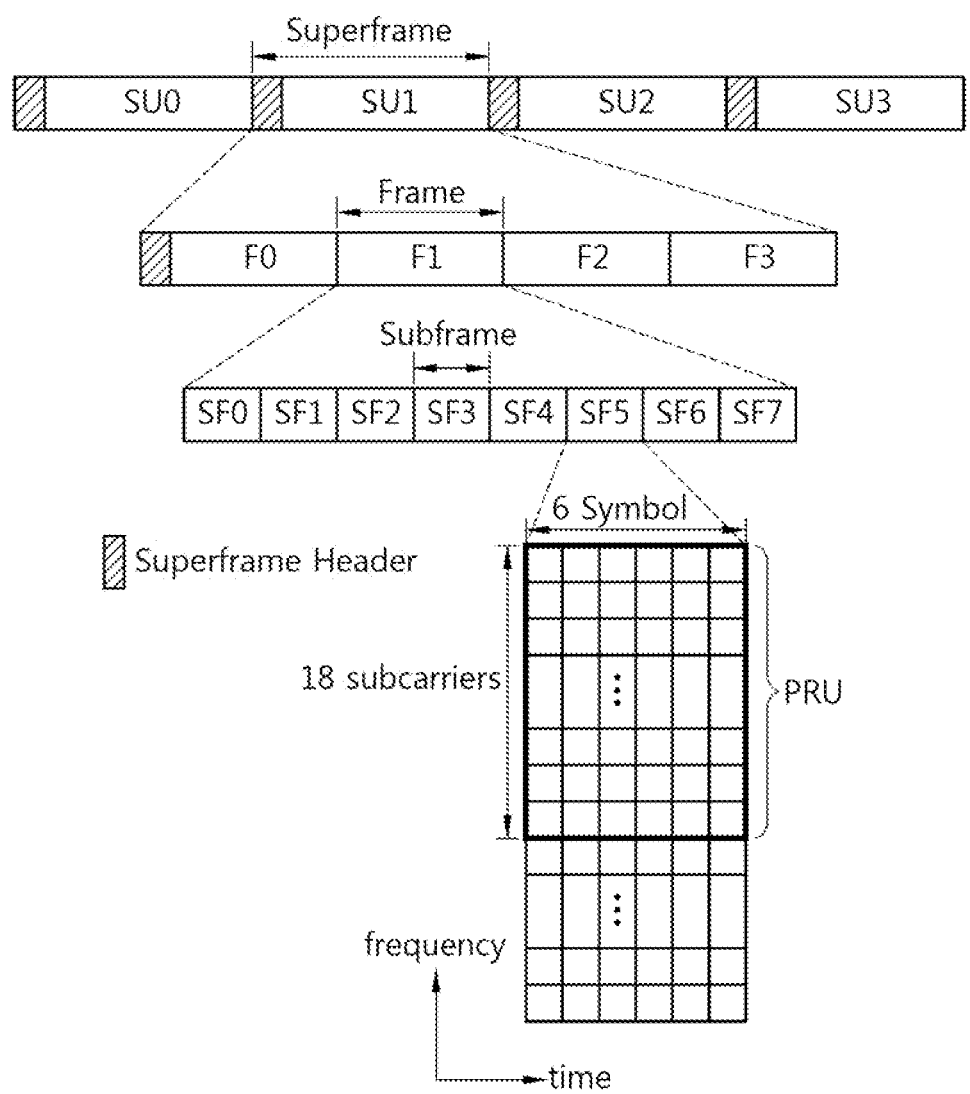
FIG. 2 is a view illustrating an example of a frame structure.

FIG. 2 shows an example of a frame structure.

Referring to FIG. 2, a superframe (SF) includes a superframe header (SFH) and four frames F0, F1, F2, and F3. Each of the frames may have the same length in the SF. Although it is illustrated that each SF has a length of 20 milliseconds (ms) and each frame has a length of 5 ms, the present invention is not limited thereto. The length of the SF, the number of frames included in the SF, the number of subframes included in a frame, or the like may be changed variously. The number of subframes included in a frame may be changed variously according to a channel bandwidth and a length of a cyclic prefix (CP).

One frame may include a plurality of subframes SF0, SF1, SF2, SF3, SF4, SF5, SF6, and SF7. Each subframe may be used for uplink or downlink transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol serves to denote one symbol period, and may be referred to by other names such as OFDMA symbol, SC-FDMA symbol, or the like, according to a multi-access scheme. The subframe may be comprised of five, six, seven, or nine OFDM symbols, but it is merely illustrative and the number of OFDM symbols included in a subframe is not limited thereto. The number of OFDM symbols included in a subframe may be changed variously according to a channel bandwidth and a CP length. A subframe type may be defined according to the number of OFDMA symbols included in a subframe. For example, a type-1 subframe may be defined to include six OFDMA symbols, a type-2 subframe may be defined to include seven OFDMA symbols, a type-3 subframe may be defined to include five OFDMA symbols, and a type-4 subframe may be defined to include nine OFDMA symbols. A single frame may include the same type of subframes. Alternatively, a single frame may include different types of subframes. Namely, the number of OFDMA symbols included in each subframe may be equal or different in a frame. Alternatively, the number of OFDMA symbols included in at least one subframe of a single frame may be different from the number of OFDM symbols of the other remaining subframes of the frame.

A subframe includes a plurality of physical resource units (PRUs) in a frequency domain. A PRU is a basic physical unit for resource allocation. A PRU may be comprised of a plurality of continuous OFDM symbols in the time domain and a plurality of continuous subcarrier in the frequency domain. According to the IEEE 802.16m standard, each subframe may be comprised of a DRU (distributed resource unit) that can obtain a diversity gain, a subband-CRU (subband contiguous resource unit) that can obtain a frequency selection gain, and a miniband-CRU that may be an intermediate form between the two types of units.

Two pilot streams may be supported in radio resource defined by a DRU. Also, in case that the number ($N_{tx}$) of transmission antennas of a BS is greater than 2, a virtual 2-transmission (2Tx) system may be generated by using a non-adaptive precoding matrix $N_{tx} \times 2$. The non-adaptive precoding matrix is varied by subband or resource unit (RU). Rank1 to 8 may be allocated to the subband-CRU and the miniband-CRU, and an adaptive precoding matrix reflecting a channel state (e.g., a downlink channel) may be applied thereto. However, in case of a DRU, a subband-CRU and a miniband-CRU employing an OL-loop (open loop) technique, a non-adaptive precoding matrix may be applied.

Primary and secondary preambles for physical synchronization are transmitted in a first OFDM symbol of each frame. Information regarding a system bandwidth and carrier configuration is included in the primary preamble, and information regarding a segment ID, IDcell, and the like, is included in the secondary preamble. SFH (Superframe Header) information including an important system parameter or system configuration information is transmitted in a first subframe of each superframe. Other broadcast information which is not urgent may be transmitted as ABI (Advanced broadcast information). The SFH broadcasting a system parameter may be transmitted according to a precoded SFBC (Space-frequency block coding) method by using a DRU (distributed resource unit). Unlike any other subframes, a subframe in which the SFH is transmitted may include radio resources entirely configured as DRUs and may have two-stream pilot.

The IEEE 802.16m BS supports various downlink MIMO operations such as OL-MIMO, CL-MIMO, and the like, by using two or more transmission antennas ($N_{tx} \geq 2$). Besides, in order to avoid interference between cells or sectors, a frequency partitioning technique for dividing and using frequency resource regions has been introduced, and in order to estimate a channel state according to antennas, a midamble may be transmitted. Also, the IEEE 802.16m BS may have a unique BS_ID and determine a method for configuring a preamble, a midamble, ranging, and permutation, and information included therein.

Time division duplex (TDD) or frequency division duplex (FDD) may be applied to a frame. In the TDD, each subframe is used for uplink or downlink transmission at the same frequency and at a different time. Namely, subframes included in a TDD frame are divided into an uplink subframe and a downlink subframe in the time domain. A switching point refers to a point at which a transmission direction is changed from an uplink region to a downlink region or from a downlink region to an uplink region. In the TDD scheme, the number of switching points in each frame may be 2. In the FDD, each subframe is used for uplink or downlink transmission at different frequencies during the same time. Namely, subframes included in an FDD frame are divided into an uplink subframe and a downlink subframe in the frequency domain. Uplink transmission and downlink transmission occupy different frequency bands and may be simultaneously performed.

Figure 3:
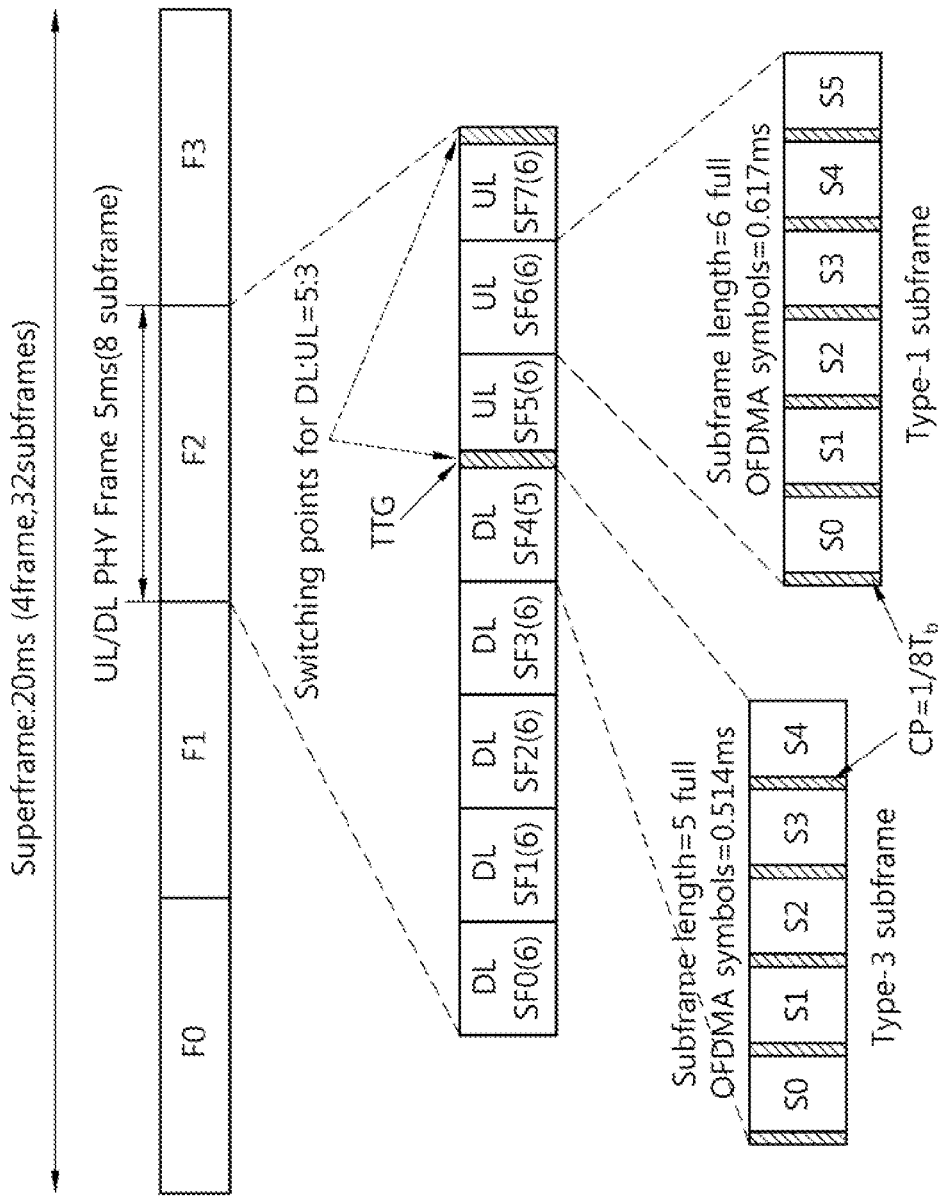
FIG. 3 is a view illustrating an example of a TDD frame structure.

FIG. 3 shows an example of a TDD frame structure, in which G=⅛. An SF having a length of 20 ms includes four frames (F0, F1, F2, and F3) each having a length of 5 ms. A single frame is comprised of eight subframes (SF0, SF1, SF2, SF3, SF4, SF5, SF6, and SF7), and a ratio between downlink subframes and uplink subframes is 5:3. The TDD frame structure of FIG. 3 may be applied to a case in which a bandwidth is 5 MHz, 10 MHz, or 20 MHz. The ending downlink subframe SF4 includes five OFDMA symbols, while the other remaining subframes include six subframes. An illustrated TTG represents a transition gap between uplink and downlink subframes.

Figure 4:
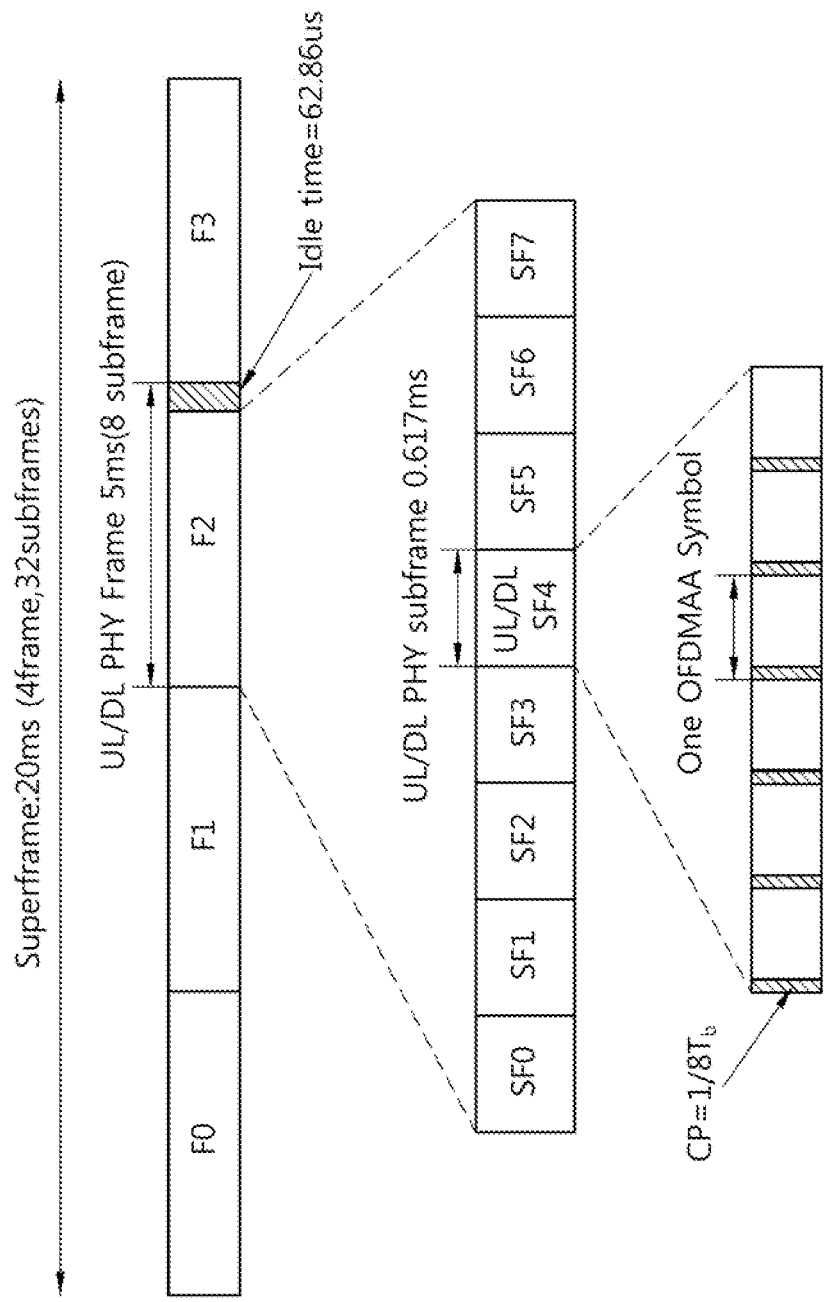
FIG. 4 is a view illustrating an example of an FDD frame structure.

FIG. 4 shows an example of an FDD frame structure, in which G=⅛. An SF having a length of 20 ms includes four frames (F0, F1, F2, and F3) each having a length of 5 ms. A single frame is comprised of eight subframes (SF0, SF1, SF2, SF3, SF4, SF5, SF6, and SF7), and all the subframes include a downlink area and an uplink area. The FDD frame structure of FIG. 4 may be applied to a case in which a bandwidth is 5 MHz, 10 MHz, or 20 MHz.

Figure 5:
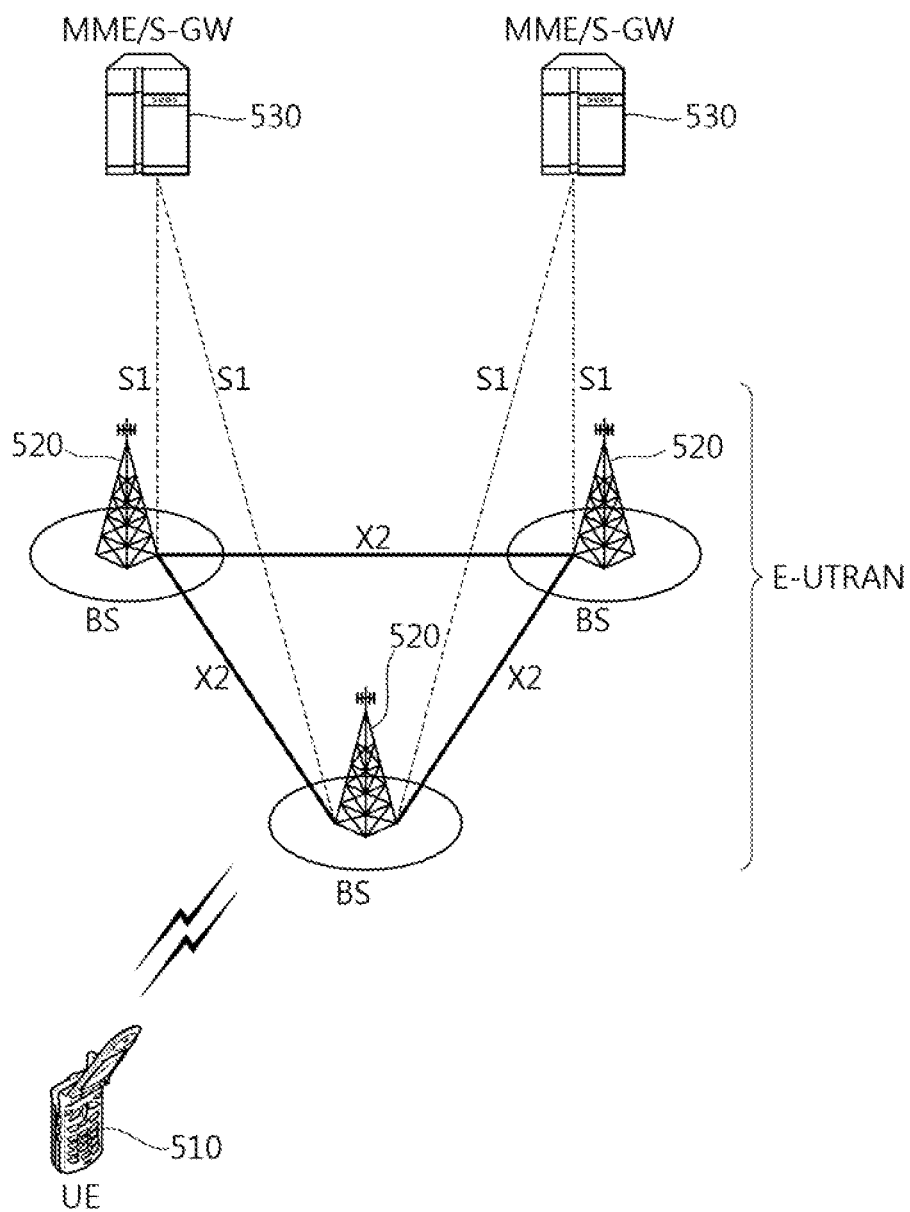
FIG. 5 is a view illustrating a wireless communication system according to an E-UMTS system.

Hereinafter, an E-UMTS (Evolved-Universal Mobile Telecommunications System) or an LTE system will be described. FIG. 5 is a block diagram illustrating a wireless communication system according to an E-UMTS system. An E-UMTS system may be called an LTE (Long Term Evolution) system. A wireless communication system may be widely disposed to provide various communication services such as voice, packet data, and the like.

Referring to FIG. 5, an E-UTRAN (Evolved-UMTS Terrestrial Radio Access Network) includes a BS 520 providing a control plane and a user plane.

A terminal (or a UE) 510 may be fixed or mobile and may be called by other names such as mobile station (MS), user terminal (UT), subscriber station (SS), wireless device, or the like. The BS 520 generally refers to a fixed station that communicates with the UE 510 and may be called by other names such as evolved NodeB (eNB), base transceiver system (BTS), access point (AP), access network (AN), and the like. One BS 520 may provide a service to at least one cell. A cell is an area providing a communication service. An interface for user traffic or control traffic transmission may be used between BSs 520. Hereinafter, downlink refers to transmission from the BS 520 to the UE 510, and uplink refers to transmission from the UE 510 to the BS 520.

The BSs 520 may be connected to each other via an interface X1. The BS 520 is connected to an EPC (Evolved Packet Core), specifically, to an MME (Mobility Management Entity)/S-GW (Serving Gateway 530, via an interface S1. The interface S1 supports a many-to-many relationship between the BS 520 and the MME/S-GWs 530.

Layers of the radio interface protocols between a UE and a network may be divided into a first layer L1, a second layer L2, and a third layer L3 based on the three lower layers of an open system interconnection (OSI) standard model widely known in communication systems. The first layer is a physical (PHY) layer. The second layer may be divided into a medium access control (MAC) layer, a radio link control (RLC) layer, and a packet data convergence protocol (PDCP) layer. The third layer is a radio resource control (RRC) layer.

The wireless communication system may be based on OFDM (Orthogonal Frequency Division Multiplexing)/OFDMA (Orthogonal Frequency Division Multiple Access) or SC-FDMA (Single Carrier FDMA).

OFDM uses a plurality of orthogonal subcarriers. OFDM uses orthogonality characteristics between IFFT (inverse fast Fourier Transform) and FFT (fast Fourier Transform). A transmitter performs IFFT on data and transmits the same. A receiver performs FFT on a reception signal to restore the original data. The transmitter uses IFFT in order to couple multiple subcarrier, and the receiver uses corresponding FFT in order to separate multiple subcarriers.

Figure 6:
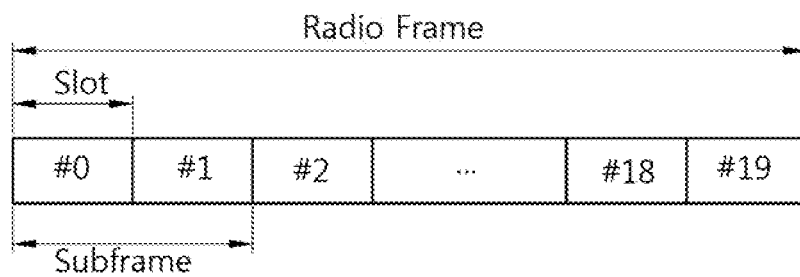
FIG. 6 is a view illustrating a structure of a radio frame.

FIG. 6 illustrates a structure of a radio frame. Referring to FIG. 6, a radio frame may be comprised of ten subframes, and a single subframe may be comprised of two slots. Slots of the radio frame are numbered from #0 to #19. A time taken for one subframe to be transmitted is called a TTI (transmission time interval). A TTI may be a scheduling unit for data transmission. For example, a length of one radio frame may be 10 ms, a length of one subframe may be 1 ms, and a length of one slot may be 0.5 ms. The structure of the radio frame is merely illustrative, and the number of subframes included in a radio frame or the number of slots included in a subframe may be variously changed.

Figure 7:
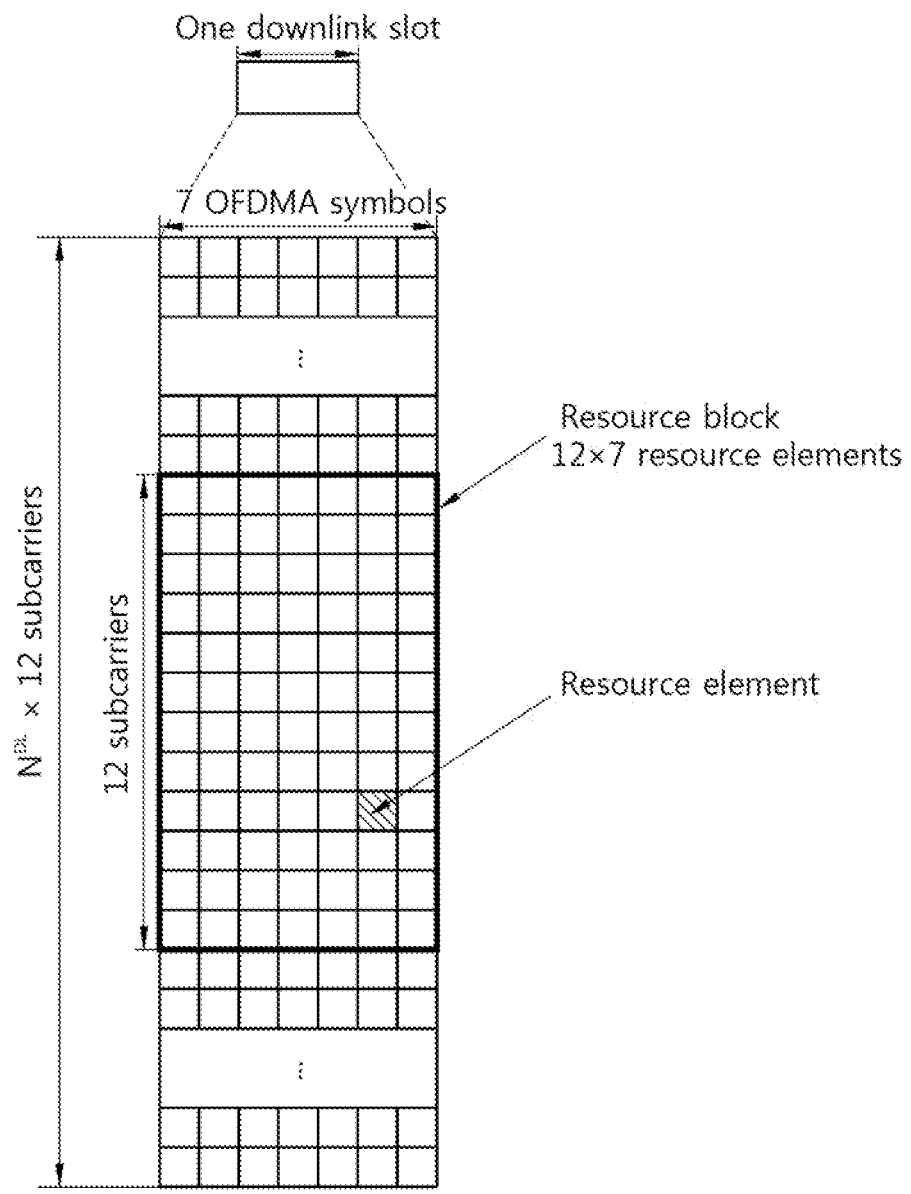
FIG. 7 is a view illustrating a resource grid of a single downlink slot.

FIG. 7 illustrates a resource grid of a single downlink slot. Referring to FIG. 7, a downlink slot includes a plurality of OFDM symbols in the time domain and $N^{DL}$ number of resource blocks (RBs) in the frequency domain. The $N^{DL}$ number of resource blocks included in the downlink slot is dependent upon a downlink transmission bandwidth set in a cell. For example, in an LTE system, $N^{DL}$ may be any one of 60 to 110. One resource block includes a plurality of subcarriers in the frequency domain.

Each element on the resource grid is called a resource element. The resource elements on the resource grid can be discriminated by a pair of indices (k,l) in the slot. Here, k (k=0, . . . , $N^{DL} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 8:
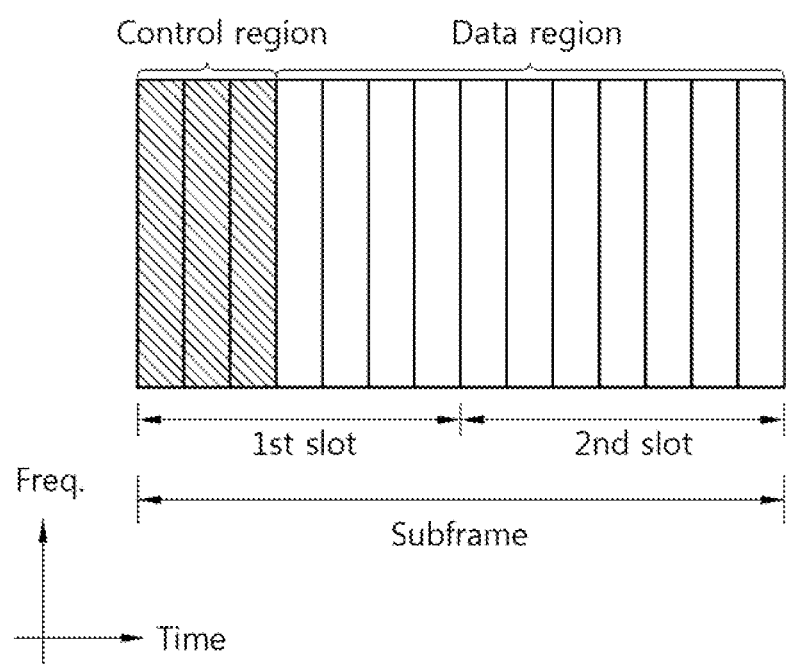
FIG. 8 is a view illustrating a structure of a downlink subframe.

FIG. 8 illustrates a structure of a downlink subframe. Referring to FIG. 8, a downlink subframe includes two consecutive slots. First three OFDM symbols of a first slot of the subframe is a control region to which a physical downlink control channel (PDCCH) is allocated, and the other remaining OFDM symbols is a data region to which a physical downlink shared channel (PDSCH) is allocated. Besides the PDCCH, a physical control format indicator channel (PCFICH), a physical HARQ indicator channel (PHICH), and the like, may be allocated to the control region. The UE may decode control information transmitted via a PDCCH to read data information transmitted via a PDSCH. Here, the inclusion of three OFDM symbols in the control region is merely illustrative, and two OFDM symbols or one OFDM symbol may be include in the control region. The number of OFDM symbols included in the control region of the subframe may be known through a PCFICH.

Control information transmitted via a PDCCH is called downlink control information (DCI). The DCI includes uplink scheduling information, downlink scheduling information, system information, an uplink power control command, control information for paging, control information for indicating an RACH response, and the like.

A DCI format includes format 0 for scheduling PUSCH (Physical Uplink Shared Channel), format 1 for scheduling PDSCH (Physical Downlink Shared channel) codeword, format 1A for compact scheduling of one PDSCH codeword, format 1B for compact scheduling with respect to rank-1 transmission of a single codeword in a spatial multiplexing mode, format 1C for very compact scheduling of DL-SCH (Downlink Shared Channel), format 1D for PDSCH scheduling in multi-user spatial multiplexing mode, format 2 for PDSCH scheduling in a closed-loop spatial multiplexing mode, format 2A for PDSCH scheduling in an open-loop spatial multiplexing mode, and format 3 for transmitting a TPC (Transmission Power Control) command for adjusting 2-bit power for PUCCH and PUSCH, format 3A for transmitting a TPC (Transmission Power Control) command for adjusting 1-bit power for PUCCH and PUSCH, and the like.

A specific example hereinafter may be applied to a first terminal supporting a first antenna system and a second terminal supporting a second antenna system. For example, the first antenna system may be a CAS (centralized antenna system), and the second antenna system may be a DAS (distributed antenna system). Hereinafter, a DAS will be described.

Unlike a centralized antenna system (CAS), some or the entirety of antennas of a BS are disposed at certain positions of a cell in a DAS. In the DAS, an antenna adjacent to a particular user may be allocated, so every DAS user within a cell may obtain high throughput performance. Also, since a BS antenna is positioned to be in proximity of a user, power of a user terminal for uplink can be lowered.

A BS supporting a DAS may be called by BS, Node-B (NB), processing server (PS), or the like, and hereinafter, a BS will be called 'PS' or 'BS'. Also, for the description purpose, antennas having a similar effect such as path loss, or the like, because an antenna space is very small relative to a cell radius like the existing case will be called centralized antennas (CAs) and antennas having different effects such as a path loss because an antenna space is greater than that of a CA will be called distributed antennas (DAs).

Figure 9:
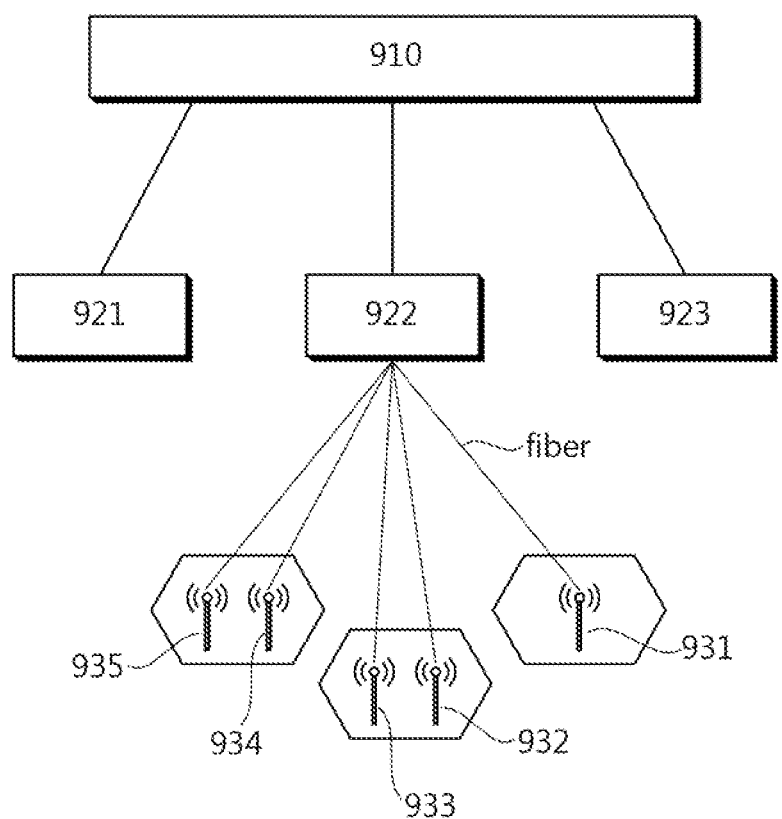
FIG. 9 is a view illustrating an example of a distributed antenna system (DAS).

FIG. 9 illustrates an example of a DAS. As illustrated, a plurality of DAs 931, 932, 933, 934, and 935 may be provided at various locations. The DAs are controlled by PSs 921, 922, and 923. If necessary, the plurality of PSs 921, 922, and 923 may be controlled by a higher network entity 910.

A below example may be applied to terminals supporting different antenna systems. A BS according to the below example may communicate with terminals supporting different antenna systems. At least one first terminal may support a first antenna system, and at least one second terminal may support a second antenna system. The first antenna system may be a CAS, and the second antenna system may be a DAS. In this case, the first terminal may be a terminal supporting only the CAS (referred to as a 'CAS terminal', hereinafter), and the second terminal may be a terminal supporting the DAS as well as the CAS (referred to as a 'CAS terminal', hereinafter).

A plurality of transmission antennas controlled by a BS may be divided into a first group and a second group. The transmission antennas of the first group may perform communication without discriminating terminals, and the transmission antennas of the second group may be allocated to a particular terminal to perform communication. For example, the transmission antennas of the first group may be MS-common transmission antennas, and the transmission antennas of the second group may be MS-specific transmission antennas as described hereinafter.

Any one of the plurality of transmission antennas may belong to both of the first group and the second group. Namely, any one of the plurality of transmission antennas may corresponding to the transmission antennas of the first group in the position of a first terminal or may be a transmission antenna of the second group in the position of a second terminal. Also, a terminal supporting the first antenna system may communicate with a transmission antenna of the first group, and a terminal supporting the second antenna system may communicate with a transmission antenna of the first group and/or a transmission antenna of the second group.

In the wireless communication system (e.g., LTE, LTE-A, IEEE 802.16m), a terminal supporting a CAS may obtain downlink data from the same number of transmission antennas (e.g., $N_{tx}$ number of transmission antennas) (e.g., the terminal may obtain data in a manner of receiving a downlink signal and decoding it). Namely, a CAS terminal obtains downlink data (including user data and control information) from $N_{tx}$ number of transmission antennas regardless of whether or not a channel is a broadcast channel or a unicast channel.

Meanwhile, a terminal supporting the DAS may obtain downlink data from a particular transmission antenna. If a BS recognizes a location of a terminal, it can allocate some transmission antennas which are close to the terminal or have a good channel state to the terminal. Information regarding a location of the terminal or a channel state may be obtained according to various methods. For example, location information or information regarding a channel state may be received from the terminal and obtained. When some transmission antennas are allocated to a terminal, a BS may turn off a transmission antenna located in the vicinity of a local region where there is no terminal, to prevent interference. When some transmission antennas are allocated to the terminal, transmission antennas minimizing a path loss can be allocated, effectively increasing system capacity.

In a wireless communication system supporting a DAS, when a DAS terminal and a CAS terminal coexist, preferably, an operation according to the DAS does not affect the CAS terminal. Also, in order to optimize performance of the DAS terminal, it is preferred to effectively use transmission antennas and radio resources. To this end, a plurality of transmission antennas may be discriminated into two concepts. Namely, transmission antennas may be discriminated into an MS-common transmission antenna and an MS-specific transmission antenna.

The MS-common transmission antenna may be a transmission antenna through which every terminal belonging to one BS may obtain downlink data. Every CAS terminal may obtain data even via a unicast channel as well as via a broadcast channel through the MS-common transmission antenna.

The MS-specific transmission antenna may be a transmission antenna that may be allocated to a particular terminal. Unlike a CAS terminal, a DAS terminal may receive a broadcast channel through the MS-common transmission antenna and a unicast channel through the MS-specific transmission antenna according to circumstances.

At least one of transmission antennas within a cell is designated as an MS-common transmission antenna. A BS or a higher network entity controlling the BS may designate the MS-common transmission antenna. For example, all the transmission antennas within a cell may be designated as MS-common transmission antennas. Alternatively, some of the entire transmission antennas may be designated MS-common transmission antennas. Alternatively, an MS-common transmission antenna may be designated by grouping transmission antennas and linearly combining signals of transmission antennas belonging to each group.

An MS-specific transmission antenna is designated for a particular terminal. In this case, an antenna set determined according to terminals may be designate as MS-specific transmission antennas. Namely, a terminal belonging to a first category is allocated an antenna belonging to a first antenna set, as an MS-specific transmission antennas, and a terminal belonging to a second category may be allocated an antenna belonging to a second antenna set, as an MS-specific transmission antenna. Since a transmission antenna available for effective communication may be changed according to a location of a terminal, so it may be advantageous to use the different antenna sets.

At least one of the plurality of transmission antennas may be designated as an MS-common transmission antenna for a CAS terminal and may be an MS-specific transmission antenna for a DAS terminal. In this case, the CAS terminal may obtain data from every channel of a corresponding transmission antenna, while the DAS terminal may obtain only a unicast channel from the corresponding transmission antenna.

The MS-common transmission antenna or the MS-specific transmission antenna may be allocated by a BS or an entity that controls the BS. In this case, transmission antennas may be allocated based on information regarding a location of a terminal or a channel state. For example, when a DAS terminal moves from a first location to a second location, a transmission antenna in a closer location may be allocated as an MS-specific transmission antenna.

Figure 10:
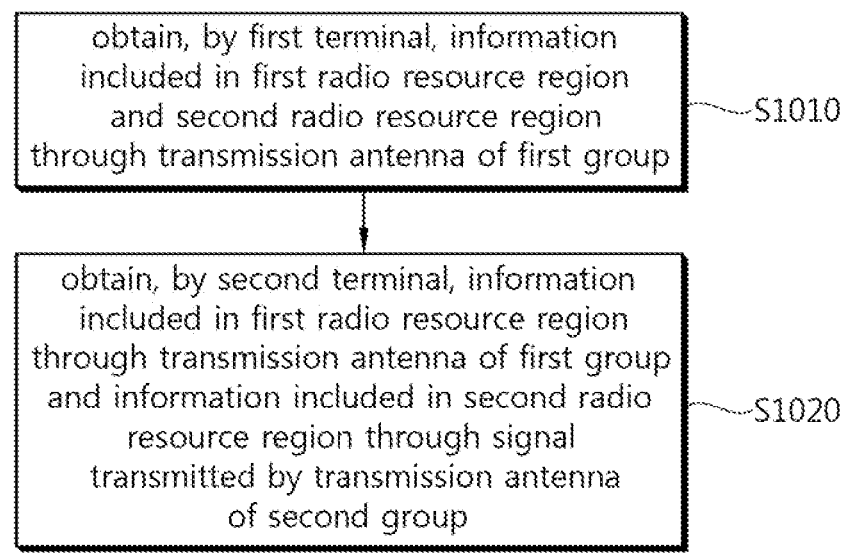
FIG. 10 is a view illustrating a flow of an example according to an embodiment of the present invention.

FIG. 10 illustrates a flow chart of a procedure illustrating an example of the present invention. As illustrated, a first terminal may obtain information included in a first radio resource region and a second radio resource region through a transmission antenna of a first group (S1010). The first terminal may be a CAS terminal and the transmission antenna of the first group may be an MS-common transmission antenna. Meanwhile, a second terminal may obtain information included in the first radio resource region through a transmission antenna of the first group and information included in the second radio resource region through a signal transmitted by a transmission antenna of the second group (S1020). The second terminal may be a DAS terminal, and the transmission antenna of the first group may be an MS-specific transmission antenna. The first radio resource region and the second radio resource region may be determined according to a type of a communication system to which the example of FIG. 10 is applied. In FIG. 10, the steps S1010 and S1020 are described to be sequentially performed, but only any one of the steps S1010 and S1020 may be performed or both of the steps S1010 and S1020 may be performed.

An example of applying the foregoing example to the IEEE 802.16m system will be described. In detail, an MS-common transmission antenna and an MS-specific transmission antenna may be selectively used according to a type of a DRU and a CRU (including a subband CRU and a miniband CRU) for a subframe of the IEEE 802.16m system. For example, the MS-specific transmission antenna is applied to a radio resource region to which different communication techniques are applied by terminals, and the MS-common transmission antenna may be applied to a radio resource region to which a communication technique common to terminals is applied. Examples of radio resource to which different communication techniques are applied by terminals include a subband-CRU and a miniband-CRU to which an adaptive precoding matrix is applied.

A BS may broadcast the number of MS-common transmission antennas, as $N_{tx}$, i.e., a parameter of the 802.16m system. When the number ($PN_{tx}$) of antennas actually installed in the BS is greater than $N_{tx}$, a general virtualization technique may be used. Namely, it is possible to allow the terminal to determine $PN_{tx}$ number of transmission antennas, as $N_{tx}$ number of transmission antennas.

As described above, the MS-common transmission antenna is applicable to a radio resource region to which a communication technique common to terminals is applied. In detail, in case of obtaining data included in a DRU, both a CAS terminal and a DAS terminal may obtain data from the MS-common transmission antenna. The DRU is radio resource used for a unicast channel, as well as an A-MAP, to obtain a diversity gain, and since a non-adaptive precoding matrix is applied, the MS-common transmission antenna may be used.

With respect to a subband-CRU and a miniband-CRU to which an adaptive precoding matrix, unlike the DRU, is applied, the MS-specific transmission antenna may be applied. Namely, the CAS terminal obtains data with the MS-common transmission antenna, while the DAS terminal obtains data from the MS-common transmission antenna and/or the MS-specific transmission antenna. Although the DAS terminal obtains data through the DRU, it may also obtain data through the MS-common transmission antenna. For example, when the DAS terminal moves at a high speed, a transmission antenna close to the past location may be designated as an MS-specific transmission antenna, so it may be advantageous to obtain data through the MS-common transmission antenna according to circumstances. Also, when a MU-MIMO technique is used, the use of the MS-common transmission antenna additionally may be advantageous. Meanwhile, when the MS-specific transmission antenna is used, new local midamble may be provided for a channel estimation of a corresponding antenna.

Meanwhile, for a subband CRU and a miniband CRU to which a non-adaptive precoding matrix is applied, the same operation as that of the DRU may be performed. Namely, in case of applying an adaptive precoding matrix technique applying a precoding matrix appropriate for a particular terminal based on channel information such as feedback information from the terminal, the MS-specific transmission antenna may be used, but in case of applying a precoding matrix common to terminals, the same operation as that of the DRU may be performed. Thus, with respect to a subband CRU and a miniband CRU designated as open-loop zones, both a CAS terminal and a DAS terminal may obtain data through the MS-common transmission antenna.

An example of an LTE system (including an LTE-A system) will be described.

As described above, in the LTE system, first to third OFDM symbols of a first slot are used as a PDCCH region, and other region may be used as a PDSCH region. User data may be included in the PDSCH region, and allocation information, or the like, with respect to user data may be included in the PDCCH. In the LTE system, a MS-common transmission antenna is used for the PDCCH, and an MS-specific transmission antenna may be used for the PDSCH.

In the LTE system, the CAS terminal may obtain data included in the PDSCH, as well as the PDCCH, through $N_{tx}$ number of MS-common transmission antennas. In this case, information regarding $N_{tx}$ may be known by a system parameter. Meanwhile, a DAS terminal may obtain data included in a PDCCH through $N_{tx}$ number of MS-common transmission antennas, and obtain data included in the PDSCH through the MS-common transmission antenna and/or the MS-specific transmission antenna. Namely, like the IEEE 802.16m system, the MS-common transmission antenna and/or the MS-specific transmission antenna may be used for a particular radio resource region.

Meanwhile, like the IEEE 802.16m system, even when the foregoing example is applied to the LTE system, a general virtualization technique may be used. Also, in order to estimate a channel of the MS-specific transmission antenna, a new local CRS or local CSI-RS, besides already proposed CRS (common Reference Signal) or the CSI-RS (Channel state information Reference Signal), may be provided. Namely, a new locally provided signal may be proposed to be discriminated from a CRS or a CSI-RS as existing cell-common reference signals.

Figure 11:
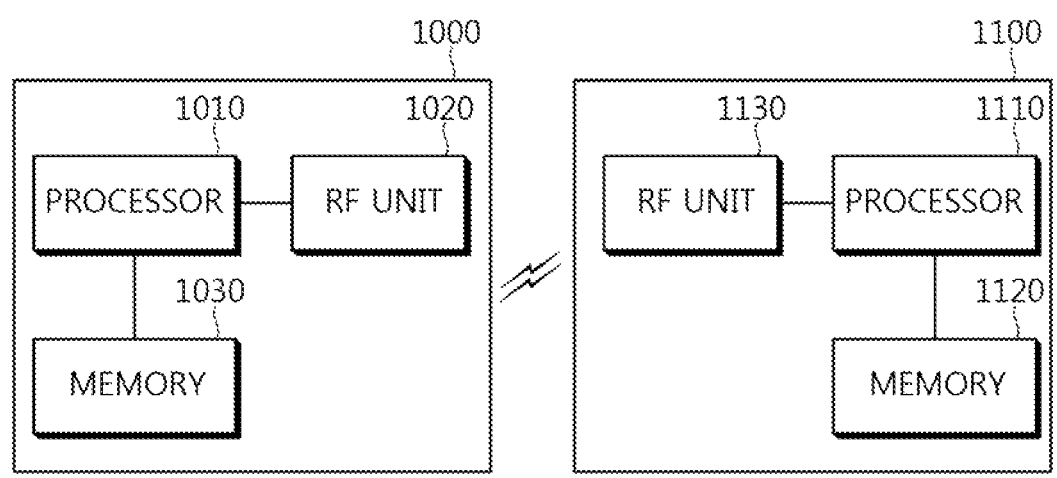
FIG. 11 is a block diagram of a terminal and a base station according to the foregoing embodiment.

FIG. 11 illustrates a mobile station (MS) and a base station (BS). A MS 1000 includes a processor 1010, a memory 1030, and an RF unit 1020. The processor 1010 may allocate radio resource according to information previously stored therein, or the like. Procedures, techniques, and functions performed by the MS in the foregoing embodiments may be implemented by the processor 1510. The memory 1030 is connected to the processor 1010 and stores various types of information for driving the processor 1010. The RF unit 1020 is connected to the processor 1010 and transmits and/or receives a radio signal.

ABS 1100 includes a processor 1110, a memory 1120, and an RF unit 1130. Procedures, techniques, and functions performed by the MS in the foregoing embodiments may be implemented by the processor 1110. The memory 1120 is connected to the processor 1110 and stores various types of information for driving the processor 1110. The RF unit 1130 is connected to the processor 1110 and transmits and/or receives a radio signal.

The processors 1010 and 1110 may include an ASIC (Application-Specific Integrated Circuit), a chip-set, a logical circuit, and/or a data processor. The memories 1030 and 1120 may include a ROM (Read-Only Memory), a RAM (Random Access Memory), a flash memory, a memory card, a storage medium, and/or any other storage devices. The RF units 1120 and 1130 may include a baseband circuit for processing a radio signal. When the embodiments are implemented by software, the foregoing techniques may be implemented by modules (processes, functions, or the like) performing the foregoing functions. The modules may be stored in the memories 1030 and 1120 and executed by the processors 1010 and 1110, respectively. The memories 1030 and 1120 may be provided within or outside the processors 1010 and 1110 and may be connected to the processors 1010 and 1110 through a well-known unit, respectively.

The method and apparatus as described above may be implemented by hardware, software, or a combination thereof. For hardware implementation, the method and apparatus as described above may be implemented by using application specific integrated circuits (ASICs), digital signal processors (DSPs), programmable logic devices (PLDs), field programmable gate arrays (FPGAs), processors, controllers, microprocessors, electronic units, or a combination thereof, designed to perform the foregoing functions. For software implementation, the method and apparatus as described above may be implemented by a module performing the foregoing functions. Software may be stored in a memory unit and executed by a processor. As the memory unit or the processor, various means well known to a person skilled in the art may be employed.

While the present invention has been shown and described in connection with the embodiments, it will be apparent to those skilled in the art that modifications and variations can be made without departing from the spirit and scope of the invention as defined by the appended claims.

The invention claimed is:

1. A method for receiving a signal from a base station including a plurality of transmission antennas in a wireless communication system including the base station, a first terminal supporting a first antenna system, and a second terminal supporting a second antenna system, the method comprising:
    obtaining, by at least one of the first terminal and the second terminal, information included in a signal received from the base station,
    wherein the signal received from the base station is received through at least one of first radio resource region or second radio resource region, the first terminal obtains information included in the first radio resource region and the second radio resource region through a signal transmitted by a transmission antenna of a first group among the plurality of transmission antennas, the second terminal obtains information included in the first radio resource region through a signal transmitted by a transmission antenna of the first group and obtains information included in the second radio resource region through a signal transmitted by a transmission antenna of the first group or a second group among the plurality of transmission antennas, the transmission antenna of the second group is allocated to the second terminal,
    wherein a precoding matrix common to the first terminal and the second terminal is applied to the first radio resource region or no precoding matrix is applied to the first radio resource region, and
    a precoding matrix specified by the first terminal and a precoding matrix specified by the second terminal are applied to the second radio resource region.

2. The method of claim 1, wherein the first antenna system is a centralized antenna system, and the second antenna system is a distributed antenna system.

3. The method of claim 1, wherein the first radio resource region and the second radio resource region include an OFDMA system, respectively.

4. The method of claim 1, wherein the transmission antennas of the first group are allocated to every terminal.

5. The method of claim 1, wherein the first radio resource region is allocated to a distributed resource unit (DRU), the first or second radio resource region is allocated to a contiguous resource unit (CRU), and the CRU includes a subband-CRU and a miniband-CRU.

6. The method of claim 5, wherein when the second terminal obtains information regarding the second radio resource region allocated to the CRU, the second terminal obtains information included in the second radio resource region through a signal transmitted by a transmission antenna of the first group and/or a signal transmitted by a transmission antenna of the second group.

7. The method of claim 1, wherein the transmission antennas belonging to the first group and the second group are determined by the BS.

8. The method of claim 1, wherein the signal received from the BS is included in at least one subframe, and each subframe is comprised of two slots, each slot includes a plurality of orthogonal frequency-division multiple access (OFDMA) symbols, a signal received from the BS includes a physical downlink control channel (PDCCH) including control information and a physical downlink shared channel (PDSCH) including user data, the first radio resource region includes the PDCCH, and the second radio resource region includes the PDSCH.

9. A method for transmitting a signal by a base station (BS) including a plurality of transmission antennas in a system including the BS, a first terminal supporting a first antenna system, and a second terminal supporting a second antenna system, the method comprising:
    transmitting, by the BS, a signal to at least one of the first terminal and the second terminal,
    wherein the signal transmitted by the BS is transmitted through at least one of first radio resource region or second radio resource region, the first terminal obtains information included in the first radio resource region and the second radio resource region through a signal transmitted by a transmission antenna of a first group among the plurality of transmission antennas, the second terminal obtains information included in the first radio resource region through a signal transmitted by a transmission antenna of the first group and obtain information included in the second radio resource region through a signal transmitted by a transmission antenna of the first group or the second group among the plurality of transmission antennas, the transmission antenna of the second group is allocated to the second terminal,
    wherein a precoding matrix common to the first terminal and the second terminal is applied to the first radio resource region or no precoding matrix is applied to the first radio resource region, and
    a precoding matrix specified by the first terminal and a precoding matrix specified by the second terminal are applied to the second radio resource region.

10. The method of claim 9, wherein the first antenna system is a centralized antenna system, and the second antenna system is a distributed antenna system.

11. A base station (BS) including a plurality of transmission antennas operated in a wireless communication system including a first terminal supporting a first antenna system, and a second terminal supporting a second antenna system, the BS comprising:
    a transceiver module transmitting a signal to at least one of the first terminal and the second terminal,
    wherein the signal transmitted by the BS is transmitted through at least one of first radio resource region or second radio resource region, the first terminal obtains information included in the first radio resource region and the second radio resource region through a signal transmitted by a transmission antenna of a first group among the plurality of transmission antennas, the second terminal obtains information included in the first radio resource region through a signal transmitted by a transmission antenna of the first group and obtain information included in the second radio resource region through a signal transmitted by a transmission antenna of the first group or the second group among the plurality of transmission antennas, the transmission antenna of the second group is allocated to the second terminal, wherein a precoding matrix common to the first terminal and the second terminal is applied to the first radio resource region or no precoding matrix is applied to the first radio resource region, and a precoding matrix specified by the first terminal and a precoding matrix specified by the second terminal are applied to the second radio resource region.

12. The base station of claim 10, wherein the first antenna system is a centralized antenna system, and the second antenna system is a distributed antenna system.

\* \* \* \* \*